United States Patent [19]

Wang et al.

[11] Patent Number: 5,693,239

[45] Date of Patent: Dec. 2, 1997

[54] POLISHING SLURRIES COMPRISING TWO ABRASIVE COMPONENTS AND METHODS FOR THEIR USE

[75] Inventors: Jiun-Fang Wang, Hockessin; Anantha Sethuraman; Huey-Ming Wang, both of Wilmington, all of Del.; Lee Melbourne Cook, Steelville, Pa.

[73] Assignee: Rodel, Inc., Newark, Del.

[21] Appl. No.: 541,898

[22] Filed: Oct. 10, 1995

[51] Int. Cl.$^6$ ................................. C23F 1/00; C23F 1/44
[52] U.S. Cl. .................... 216/88; 216/89; 216/100; 216/102; 216/105; 252/79.1; 51/309
[58] Field of Search .................... 156/636.1, 645.1; 216/88, 89, 100, 102, 105; 252/79.1; 106/3, 6; 51/309

[56] References Cited

U.S. PATENT DOCUMENTS

| | | | |
|---|---|---|---|
| 4,855,264 | 8/1989 | Mathers et al. | 501/98 |
| 4,944,836 | 7/1990 | Beyer et al. | 156/645 |
| 4,956,015 | 9/1990 | Okajima et al. | 252/79.1 |
| 4,956,313 | 9/1990 | Cote et al. | 437/203 |
| 4,959,113 | 9/1990 | Roberts | 156/636 |
| 5,209,816 | 5/1993 | Yu et al. | 156/636.1 |
| 5,244,534 | 9/1993 | Yu et al. | 156/636 |
| 5,340,370 | 8/1994 | Cadien et al. | 51/308 |
| 5,366,542 | 11/1994 | Yamada et al. | 106/3 |
| 5,382,272 | 1/1995 | Cook et al. | 51/293 |
| 5,389,194 | 2/1995 | Rostoker et al. | 252/79.3 |
| 5,391,258 | 2/1995 | Branceleoni et al. | 156/636.1 |
| 5,525,191 | 6/1996 | Maniar et al. | 156/636.1 |
| 5,527,423 | 6/1996 | Neville et al. | 106/3 |

FOREIGN PATENT DOCUMENTS

| | | |
|---|---|---|
| 745656 A1 | 12/1996 | European Pat. Off. . |
| 747939 A2 | 12/1996 | European Pat. Off. . |
| 252091 | 12/1987 | Germany . |

OTHER PUBLICATIONS

"Chemical-Mechanical Polishing For Fabricating Patterned W Metal Features As Chip Interconnects", F. Kaufman et al., J. Electrochem. Soc., vol. 138, p. 3460, 1991.

"Nanometer Sized Alumina Polishing Slurry", D. Rostoker, Norton Materials, Worcester, MA 1994.

"Pattern Density Effects In Tungsten CMP", Rutten et al., Proc. VMIC 1995, pp. 491–497, 1995.

*Primary Examiner*—R. Bruce Breneman
*Assistant Examiner*—Anita Alanko
*Attorney, Agent, or Firm*—Kenneth A. Benson

[57] ABSTRACT

An aqueous slurry is provided for polishing or planarizing a work piece which contains a metal, the solids portion of said slurry being comprised of 1 to 50 percent by weight of submicron alpha-alumina, the remainder of the solids being of a substantially less abrasive composition chosen from the group consisting of aluminum hydroxides, gamma-alumina, delta-alumina, amorphous alumina, and amorphous silica. Also provided is a method for polishing the surface of a work piece which contains a metal wherein said aqueous slurry is used as the polishing composition during chemical-mechanical polishing.

20 Claims, No Drawings

POLISHING SLURRIES COMPRISING TWO ABRASIVE COMPONENTS AND METHODS FOR THEIR USE

BACKGROUND OF THE INVENTION

1. Field of the Invention

The invention relates to the polishing of metals, dielectric/metal composites, semiconductors and integrated circuits. More particularly, this invention relates to the improvement of slurries containing abrasive particles which are used in the planarization of semiconductor and integrated circuit wafers.

2. Description of the Related Art

Conventional polishing compositions or slurries generally consist of a solution which contains abrasive particles. The part, or substrate, is bathed or rinsed in the slurry while an elastomeric pad is pressed against the substrate and the pad and substrate are moved relative to each other. Thus the abrasive particles are pressed against the substrate under load and the lateral motion of the pad causes the abrasive particles to move across the substrate surface, resulting in wear and volumetric removal of the substrate surface.

In many cases the rate of surface removal is determined solely by the degree of applied pressure, the velocity of pad rotation and the chemical activity of the slurry particle. Enhancement of the chemical activity of the polishing particle has been the basis of numerous patents, for example U.S. Pat. No. 4,959,113 (Roberts) and U.S. Pat. No. 5,382,272 (Cook et al.) both assigned to Rodel, Inc., Newark, Del.

An alternative means of increasing polishing rates is to add components to the slurries which by themselves are corrosive to the substrate. When used together with abrasive particles, substantially higher polishing rates may be achieved. This process, often termed chemical-mechanical polishing (CMP) is a preferred technique for polishing of semiconductors and semiconductor devices, particularly integrated circuits. Often additives are introduced to the slurries which accelerate the dissolution of the metal component in the polishing of dielectric/metal composite structures such as interconnect vias in integrated circuit structures. The purpose of this and other related techniques is to preferentially remove the metal portion of the circuit so that the resulting surface becomes coplanar with an insulating or dielectric feature, typically composed of $SiO_2$. This process is termed planarization.

Often, oxidizing agents, such as hydrogen peroxide, are added to slurries used for CMP so that the metal surface is converted to an oxide which is then subject to the chemical and mechanical action of the polishing slurry. A general review of this art is provided by F. Kaufman et al., J. Electrochem. Soc., vol. 138, p. 3460, 1991, incorporated by reference herein.

As pointed out by Kaufman et al., abrasives commonly employed in CMP of metal device structures commonly employ alumina or silica particles in the slurry to provide abrasive activity. While silica is exclusively used in the amorphous state for polishing purposes, aluminum oxide particles may be commercially produced in both amorphous and crystalline forms having varying degrees of hydration. These materials may be grouped into three classes, depending on their degree of hydration. The first category may be termed aluminum hydrates, with a nominal formula of $Al(OH)_3$. Examples of commercially produced compounds of this class are Bayerite (gamma-aluminum hydrate) and Gibbsite (alpha-aluminum hydrate). The second category may be termed aluminum monohydroxides, with a nominal formula of AlOOH. Examples of commercially produced compounds of this category are Diaspore (gamma-aluminum hydroxide), and Boehmite (alpha-aluminum hydroxide). The third category represents the solid oxide $(Al_2O_3)$. Examples of commercially produced compounds of this category are gamma-alumina, and alpha-alumina. All of the crystalline compounds are generally viewed as steps in the dehydration sequence of aluminum oxide, whose end product is alpha-alumina.

Prior art has made no distinction as to the relative merits of any of these classes of aluminum oxides in the polishing process. For example, U.S. Pat. No. 4,944,836 (Beyer et al.), U.S. Pat. No. 4,956,313 (Cote et al.), U.S. Pat. No. 5,244,534 (Yu et al.), and U.S. Pat. No. 5,391,258 (Brancaleoni et al.), all patents disclosing prior art slurries for the CMP of metal semiconductor devices, simply teach the use of alumina abrasive particles. It is generally recognized by those skilled in the art that the primary reason for use of aluminum oxide abrasive particles in metal CMP is their stability in acidic environments, typically pH 1–6, where a dispersion of silica particles would be unstable.

As cited in U.S. Pat. No. 5,340,370 (Cadien et al.), the chief deficiency of aluminum oxide abrasive particles is their tendency to scratch the surface of the substrate. Historically, this has led to the use of less abrasive forms of aluminum oxide, particularly Boehmite and gamma-alumina for polishing purposes (see "Nanometer sized alumina polishing slurry", D. Rostoker, Norton Materials, Worcester, Mass. 1994). Typically these less abrasive particles show polishing activity similar to that of SiO2.

Despite the advantages of such less abrasive slurry particles for decreasing scratching, other serious disadvantages are observed when they are used. As pointed out by Cadien (U.S. Pat. No. 5,340,370), the chief disadvantage is that these less abrasive slurry particles have very little polishing activity toward TiN and Ti bond layers commonly employed to ensure adhesion of the contacting metal. This bond layer must be removed from all horizontal surfaces during CMP to yield working devices. Rutten et al ("Pattern Density Effects in Tungsten CMP", Proc. VMIC 1995, pp. 491–7, 1995), recently reviewed the effects of bond layer removal on CMP of metal device wafers. As erosion of integrated circuit features increases, the bond layer selectivity (the ratio of the removal rates of the metal to the bond layer), increases. Ideally, this ratio should be very low, i.e., 1, while simultaneously maintaining a high selectivity against the dielectric phase $(SiO_2)$.

As cited in Cadien, prior art metal CMP slurries using less abrasive slurry particles commonly exhibit bond layer selectivities equivalent to the selectivity towards the dielectric layer, i.e., they are undesirably high. This results in an unacceptably long polishing time for the complete removal of the bond layer (in prior art slurries, bond layer removal may represent as much as 30% of the total polishing time) or, as cited by Cadien, an additional polishing step may be employed.

It is clear from the above discussion that if metal CMP slurries having simultaneous high removal rate of the metal phase, high selectivity toward the dielectric phase and low selectivity towards the bond layer could be prepared, they would represent significant improvements in the state of the art.

SUMMARY OF THE INVENTION

One aspect of the present invention is an aqueous slurry for polishing or planarizing a work piece which contains a metal, the solids portion of said slurry being comprised of 1 to 50 percent by weight of submicron alpha-alumina, the remainder of the solids being of a substantially less abrasive composition. The substantially less abrasive solids are chosen from the group consisting of aluminum hydroxides, gamma-alumina, delta-alumina, amorphous alumina, and amorphous silica. Another aspect of the present invention is a method of polishing or planarizing the surface of a work piece which contains a metal comprising (a) applying an aqueous slurry, the solids portion of which contains 1 to 50 percent fully crystalline alpha-alumina with the remainder of the solids being of a substantially less abrasive composition, to the surface of a work piece to be polished or planarized and (b) polishing or planarizing the surface of the work piece by chemical-mechanical polishing means.

DETAILED DESCRIPTION OF THE INVENTION

In the present invention we have discovered the unexpectedly high rate of metal removal from a work piece undergoing chemical-mechanical polishing when the solids in the aqueous slurry being employed are 1 to 50 percent submicron alpha-alumina, the remainder of the solids being of a second substantially less abrasive phase. The polishing rate of such a slurry is substantially greater than that obtained when the solids in the aqueous slurry being employed are 100 percent alpha-alumina of equivalent particle size and the rate is several times greater than that obtained when the solids in the slurry being employed contain only the substantially less abrasive and/or non-crystalline (amorphous) solids. Simultaneous with this high rate, slurries of the present invention exhibit unexpectedly high rate selectivities relative to $SiO_2$ and unexpectedly low selectivities relative to bond layers. The performance of these slurries appear to be a significant improvement on the current state of the art.

The slurries of the present invention may further comprise oxidizing agents, such as those described by Cadien (U.S. Pat. No. 5,340,370), and compounds which suppress the rate of removal of silica, such as those described by Brancaleoni (U.S. Pat. No. 5,391,258). It is also recognized that other additives commonly employed in the art, such as surfactants, suspension aids, etc., may also be incorporated without departing from the essential features of the present invention.

An oxidizing agent used in the polishing compositions of the present invention may be any oxidant soluble in the aqueous medium provided that the oxidation potential of the oxidizing agent is greater than the oxidation potential of the metal being polished. Common oxidizing agents are chlorates, perchlorates, chlorites, iodates, nitrates, persulfates, peroxides, ozonated water and oxygenated water.

Compounds which suppress the rate of removal of silica are described by Brancaleoni (U.S. Pat. No. 5,391,258) as compounds which contain at least two acid groups and where the pKa of the first dissociable acid is not substantially larger than the pH of the polishing composition used as the polishing slurry. Examples of such compounds are potassium hydrogen phthalate and ammonium hydrogen phthalate.

The unique feature of slurries of the present invention is the simultaneous presence of both alpha-alumina and less abrasive particles, both of submicron size. The function of the alpha-alumina is to provide high removal rate and low rate selectivity relative to the bond layer. The simultaneous presence of the less abrasive particles results in an unexpected reduction in the removal rate of the dielectric phase while maintaining the high rate of removal of the other phases. This results in a desirably high rate selectivity relative to the dielectric phase. This unexpected effect is clearly set forth in the example below.

The less abrasive particles used in combination with alpha-alum in the present invention may be selected from a group consisting of aluminum hydroxides, gamma-alumina, delta-alumina, amorphous (non-crystalline) alumina, and amorphous (non-crystalline) silica. The essential feature of this second phase is that it be less abrasive. Its function is believed to be the reduction of the polishing rate of the dielectric component of the device relative to pure alpha-alumina so that the metal/dielectric polishing selectivity is increased. Aluminum oxide compounds are preferred as they possess the aforementioned acid stability and are highly chemically compatible with the alpha-alumina component. Amorphous silica may also be used as the less abrasive particle, but such combinations exhibit coagulation and sedimentation effects on long term storage. While this does not negatively affect the function of the slurry it is undesirable in commercially manufactured slurries, and is therefore not preferred unless the slurry mixtures are made up shortly before use.

The less abrasive aluminum oxide materials may be selected from any number of commercially available compounds. These include; Bayerite (gamma-aluminum hydrate), Gibbsite (alpha-aluminum hydrate), Diaspore (gamma-aluminum hydroxide), Boehmite (alpha-aluminum hydroxide), gamma-aluminum oxide, delta-aluminum oxide, and amorphous aluminum oxide. All are useful when used in particle sizes below 1 micron. They may be used in combination over any desired range based on purity, materials cost or other considerations. Amorphous aluminum oxide produced by flame synthesis (commonly known as fumed alumina), Boehmite (alpha-aluminum hydroxide), and gamma-aluminum oxide are preferred as the less abrasive solid component as they are readily available in high purity submicron form at low cost.

The slurries of this invention may be prepared by any method used by those skilled in the art. The following example outlines a typical method of slurry preparation together with its use in CMP of tungsten (W) metal. Formulas useful for the CMP of other types of metals commonly employed in the microelectronics industry, e.g., aluminum, copper, nickel, tantalum, etc. may be readily prepared following the guidelines set forth in the present disclosure, with equivalently improved results over prior art slurries.

EXAMPLE

A one gallon lot of slurry was prepared by mixing together the following ingredients in the stated weight percentages in a polyethylene container using a conventional motorized stirrer to form a homogeneous liquid:

| Compound | Weight percent |
| --- | --- |
| Water | 85.5% |
| Ammonium hydrogen phthalate | 3.5% |
| $KIO_3$ | 3% |
| Submicron abrasive | 7% |

This nominal composition falls within the scope of U.S. Pat. No. 5,391,258 (Brancaleoni et al.) as it contains both an oxidizer (KIO$_3$) and an agent useful for suppression of the dielectric polishing rate (ammonium hydrogen phthalate).

Six lots of slurry were prepared wherein each lot had the same percentage of submicron abrasive but where the fraction of said submicron abrasive provided as alpha-alumina varied from 0% to 100%. Amorphous fumed alumina was used to provide the remainder of the abrasive material. Both materials had closely similar particle sizes of ~0.15 micron.

These lots of slurry were used to polish 6 in. diameter silicon wafers having coatings of tungsten, TiN, and SiO$_2$ using a Westech 372 polishing machine and a Rodel IC1000/SubaIV polishing pad with the following process conditions:

| Pressure | 8 psi |
|---|---|
| Carrier speed | 30 rpm |
| Table speed | 50 rpm |
| Carrier back pressure | 4 psi |
| Pad conditioning | 3 sweeps between runs |

The polishing rate for each wafer polished was determined by measurement of the film thickness before and after polishing and dividing by the polishing time. Selectivities were calculated by the ratios of the rates of the relevant materials. Results are summarized in Table 1 below:

TABLE 1

Effect of alpha-alumina content on CMP performance

| % alpha-alumina | tungsten rate (Angstroms/min) | SiO$_2$ rate (Angstroms/min) | TiN rate (Angstroms/min) | W/SiO$_2$ selectivity | W/TiN selectivity |
|---|---|---|---|---|---|
| 0 | 823 | 3.5 | <100 | 235:1 | >8:1 |
| 3 | 2843 | 46 | n.a. | 62:1 | |
| 5 | 3890 | 55 | n.a. | 71:1 | |
| 25 | 3960 | 31 | 3500 | 128:1 | 1.1:1 |
| 50 | 4040 | 55 | 3500 | 73:1 | 1.1:1 |
| 100 | 3127 | 98 | 3000 | 32:1 | 1:1 |

The striking rate enhancement in tungsten removal rate afforded by incorporation of alpha-alumina is clearly evident. Even the minimum mount of alpha-alumina tested (3%) gave almost as high a removal rate as when 100% alpha-alumina was employed.

Surprisingly, when the alpha-alumina content was further increased to 5–50% of the total solids, tungsten removal rates were substantially higher than when 100% alpha-alumina was employed.

In contrast, the tungsten/SiO$_2$ selectivity decreased with increasing alpha-alumina content, being lowest at 100% alpha-alumina and highest at 0%. However, when both alpha- and amorphous alumina were present together in the slurry, the selectivity was markedly higher than the 100% alpha-alumina example. Simultaneously these mixed alumina slurries showed enhanced tungsten removal rate.

The tungsten/TiN selectivity was almost constant as long as some amount of alpha-alumina was present in the dispersion. When only amorphous alumina particles were used, the TiN removal rate was negligible. This is consistent with the teachings of Cadien.

It is therefore clear that a mixture of submicron alpha-alumina and a less abrasive second particle source, present together in the slurry, can provide a unique combination of simultaneous high metal removal rate, high metal/SiO$_2$ selectivity, and low metal/bond layer selectivity.

While the formulations disclosed represent a substantial improvement in the state of the art, additional improvements and usages will become apparent to those skilled in the art after reviewing the claims and specifications below.

We claim:

1. An aqueous slurry, useful for the chemical-mechanical polishing of substrates which contain a metal, comprising: water, submicron alpha-alumina particles, and one or more of a substantially less abrasive submicron solid particle chosen from the group consisting of gamma-alumina, delta-alumina, amorphous alumina, and amorphous silica, wherein said alpha-alumina constitutes 1 to 50 percent by weight of the total solids in said slurry as used.

2. An aqueous slurry according to claim 1 wherein said alpha-alumina constitutes 5 to 25 percent by weight of the total solids in said slurry.

3. An aqueous slurry according to claim 1 further comprising an oxidizing agent.

4. An aqueous slurry according to claim 2 further comprising an oxidizing agent.

5. An aqueous slurry according to claim 3 further comprising an agent to suppress the rate of removal of silica.

6. An aqueous slurry according to claim 4 further comprising an agent to suppress the rate of removal of silica.

7. An aqueous slurry according to claim 1, 2, 3, 4, 5 or 6 wherein said alpha-alumina is employed in combination with submicron particles of gamma-alumina.

8. An aqueous slurry according to claim 1, 2, 3, 4, 5 or 6 wherein said alpha-alumina is employed in combination with submicron particles of amorphous alumina.

9. An aqueous slurry according to claim 1, 2, 3, 4, 5 or 6 wherein said alpha-alumina is employed in combination with submicron particles of amorphous silica.

10. A method for polishing or planarizing the surface of a work piece which contains a metal comprising (a) applying an aqueous slurry comprising: water, submicron alpha-alumina particles, and one or more of a substantially less abrasive submicron solid particle chosen from the group consisting of gamma-alumina, delta-alumina, amorphous alumina, and amorphous silica, where said alpha-alumina constitutes 1 to 50 percent by weight of the total solids in said slurry, to the surface of said work piece and (b) polishing or planarizing the surface of said work piece by chemical-mechanical polishing means.

11. A method according to claim 10 wherein said alpha-alumina constitutes 5 to 25 percent by weight of the total solids in said slurry.

12. A method according to claim 10 wherein said slurry further comprises an oxidizing agent.

13. A method according to claim 11 wherein said slurry further comprises an oxidizing agent.

14. A method according to claim 12 wherein said slurry further comprises an agent to suppress the rate of removal of silica.

15. A method according to claim 13 wherein said slurry further comprises an agent to suppress the rate of removal of silica.

16. A method according to claim 10, 11, 12, 13, 14 or 15 in which said metal contained in said work piece is tungsten.

17. A method according to claim 10, 11, 12, 13, 14 or 15 in which said metal contained in said work piece is aluminum.

18. A method according to claim 10, 11, 12, 13, 14 or 15 in which said metal contained in said work piece is copper.

19. A method according to claim 10, 11, 12, 13, 14 or 15 in which said metal contained in said work piece is nickel.

20. A method according to claim 10, 11, 12, 13, 14 or 15 in which said metal contained in said work piece is tantalum.

* * * * *